(12) United States Patent
Tsutsumi et al.

(10) Patent No.: US 11,708,236 B2
(45) Date of Patent: Jul. 25, 2023

(54) FISHING SPINNING REEL

(71) Applicant: GLOBERIDE, Inc., Tokyo (JP)

(72) Inventors: Wataru Tsutsumi, Toyko (JP); Yusuke Hirota, Tokyo (JP); Daisuke Tsushima, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 17/587,089

(22) Filed: Jan. 28, 2022

(65) Prior Publication Data

US 2022/0259005 A1 Aug. 18, 2022

(30) Foreign Application Priority Data

Feb. 12, 2021 (JP) ................................. 2021-020494

(51) Int. Cl.
*A01K 89/01* (2006.01)
*B65H 75/44* (2006.01)
(Continued)

(52) U.S. Cl.
CPC ....... *B65H 75/4413* (2013.01); *A01K 89/006* (2013.01); *A01K 89/0183* (2015.05); *B65H 57/04* (2013.01); *B65H 2701/355* (2013.01)

(58) Field of Classification Search
CPC .......... A01K 89/0108; A01K 89/01082; A01K 89/011221; A01K 89/011223; B65H 57/04; B65H 57/06
See application file for complete search history.

(56) References Cited

U.S. PATENT DOCUMENTS 5,848,757 A * 12/1998 Amano .............. A01K 89/0108
242/231
5,855,327 A * 1/1999 Kaneko .............. A01K 89/0108
242/231
(Continued)

FOREIGN PATENT DOCUMENTS

CN 104106553 A * 10/2014 ............. A01K 89/01
EP 3178317 A1 * 6/2017 ....... A01K 89/01085
(Continued)

OTHER PUBLICATIONS

Extended European Search Report for related European Application No. 22155494.2; action dated Jul. 7, 2022; (11 pages).
(Continued)

*Primary Examiner* — Emmanuel M Marcelo
(74) *Attorney, Agent, or Firm* — K&L Gates LLP (57) ABSTRACT

Provided is a fishing spinning reel including a fishing line guide that guides a fishing line to a spool, and the fishing line guide includes a line roller that guides the fishing line picked up by a bail to the spool, and a line slider that guides the fishing line from the bail to the line roller. The line slider includes an attachment part that the bail is integrally joined to or formed with, and a wall that separates a first depression from a second depression, the first depression accommodating at least a part of a head of an arm-lever fastening screw member when the arm-lever fastening screw member is attached, the second depression accommodating an end of the line roller and covering an outer periphery of the end with a minute gap provided, and the wall and the line slider are formed of a single member.

3 Claims, 5 Drawing Sheets (51) Int. Cl.
*A01K 89/015* (2006.01)
*A01K 89/00* (2006.01)
*B65H 57/04* (2006.01)

(56) References Cited

U.S. PATENT DOCUMENTS

| | | | |
|---|---|---|---|
| 6,220,537 B1 * | 4/2001 | Amano | A01K 89/0108 |
| | | | 242/231 |
| 2006/0027691 A1 | 2/2006 | Ochiai | |
| 2009/0152389 A1 * | 6/2009 | Ochiai | A01K 89/01083 |
| | | | 242/231 |
| 2019/0124901 A1 * | 5/2019 | Takamatsu | A01K 89/0114 |

FOREIGN PATENT DOCUMENTS

| | | | | |
|---|---|---|---|---|
| JP | H11178485 A | | 7/1999 | |
| JP | 3510465 B2 | | 3/2004 | |
| JP | 3510466 B2 | | 3/2004 | |
| JP | 2009278915 A | | 12/2009 | |
| KR | 20090066216 A | * | 6/2009 | A01K 89/0108 |

OTHER PUBLICATIONS

Examination Report for related Australian Application No. 2022200650; action dated Apr. 20, 2023; (4 pages).
Office Action in connection with Chinese Patent Application No. 202210115059.X; action dated May 10, 2023; (23 pages).

\* cited by examiner

FISHING SPINNING REEL

CROSS-REFERENCE TO RELATED APPLICATIONS

This application claims priority under 35 U.S.C. § 119 to Japanese Patent Application No. 2021-020494 filed on Feb. 12, 2021, in the Japanese Patent Office, the entire contents of each hereby incorporated by reference.

FIELD

The present disclosure relates to a fishing spinning reel, and more particularly to a fishing spinning reel including a unique fishing line guide disposed on an arm lever of a rotor.

BACKGROUND

In general, a fishing spinning reel includes a rotor that rotates by rotation operation of a handle for line retrieval and a spool that moves back and forth by the rotation operation, and a pair of arms that orbits around the spool is attached to the rotor. An arm lever (bail support member) is supported at each distal end of the pair of arms so as to pivot (be repositioned) between a fishing line retrieve position and a fishing line cast position, and a fishing line guide is attached to one of the arm levers.

As the above-described fishing line guide, for example, the structure disclosed in JP 3510465 B2 and JP 3510466 B2 is known. The fishing line guides disclosed in JP 3510465 B2 and JP 3510466 B2 have a structure in which a bail and a line slider are integrally formed of a plate material or a pipe material, and a support member to which a screw member is fastened is press-fitted to an opening end of the line slider. The fishing line guide disclosed in JP 3510465 B2 has a structure in which the screw member is inserted from a line slider side, and the fishing line guide disclosed in JP 3510466 B2 has a structure in which the screw member is inserted from an arm lever side.

SUMMARY

The above-described fishing line guides disclosed in JP 3510465 B2 and JP 3510466 B2 have a structure in which a separate support member is press-fitted and fastened to the opening end of the line slider, thereby causing an increase in weight and making rotor rotation unbalanced, which in turn makes fishing operability poor. Further, the fishing line guide disclosed in JP 3510466 B2 has a structure in which the screw member is inserted from the arm lever side, thereby making the fishing line prone to tangle and thus making fishing operability poor.

The present disclosure has been made in view of the above-described problems, and it is therefore an object of the present disclosure to provide a fishing spinning reel that allows a reduction in weight of a line slider as much as possible to make rotation well-balanced, and allows an increase in fishing operability.

In order to achieve the above-described object, a fishing spinning reel according to an aspect of the present disclosure includes a rotor that rotates by rotation operation of a handle rotatably supported by a reel main body, a spool that moves back and forth by the rotation operation of the handle, and a fishing line guide disposed on one of arm levers pivotably supported by a pair of arms provided on the rotor to guide a fishing line to the spool. The fishing line guide includes a line roller that guides the fishing line picked up by a bail attached to the pair of arms to the spool, and a line slider that guides the fishing line from the bail to the line roller. The line slider includes an attachment part that the bail is integrally joined to or formed with, and a wall that separates a first depression from a second depression, the first depression accommodating at least a part of a head of an arm-lever fastening screw member when the arm-lever fastening screw member is attached, the second depression accommodating an end of the line roller and covering an outer periphery of the end with a minute gap provided, and the wall and the line slider are formed of a single member.

In the fishing spinning reel structured as described above, the line slider of the fishing line guide and the wall that separates the first depression from the second depression are formed of a single member, so that it is possible to reduce the weight of the line slider as much as possible and increase fishing operability. Further, the arm-lever fastening screw member of the fishing line guide is structured to cause at least the part of the head to be accommodated in the first depression located opposite from the second depression that accommodates the line roller, so that it is possible to effectively prevent the fishing line from tangling and increase fishing operability.

The fishing spinning reel according to the present disclosure allows a reduction in weight of the line slider as much as possible to make rotation well-balanced, and allows an increase in fishing operability.

DETAILED DESCRIPTION

Figure 1:
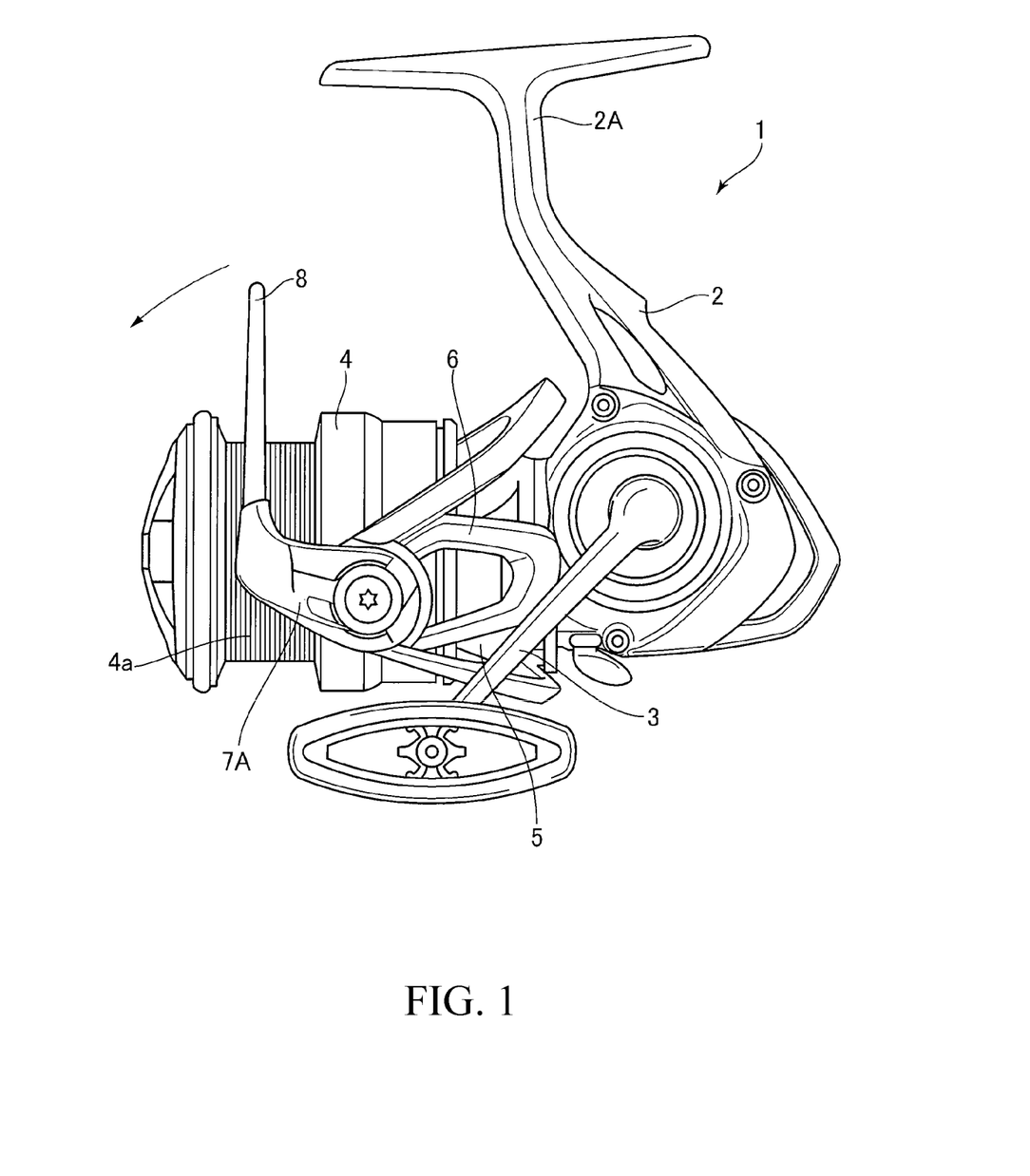
FIG. 1 is a side view of an embodiment of a fishing spinning reel according to the present disclosure.
Figure 2:
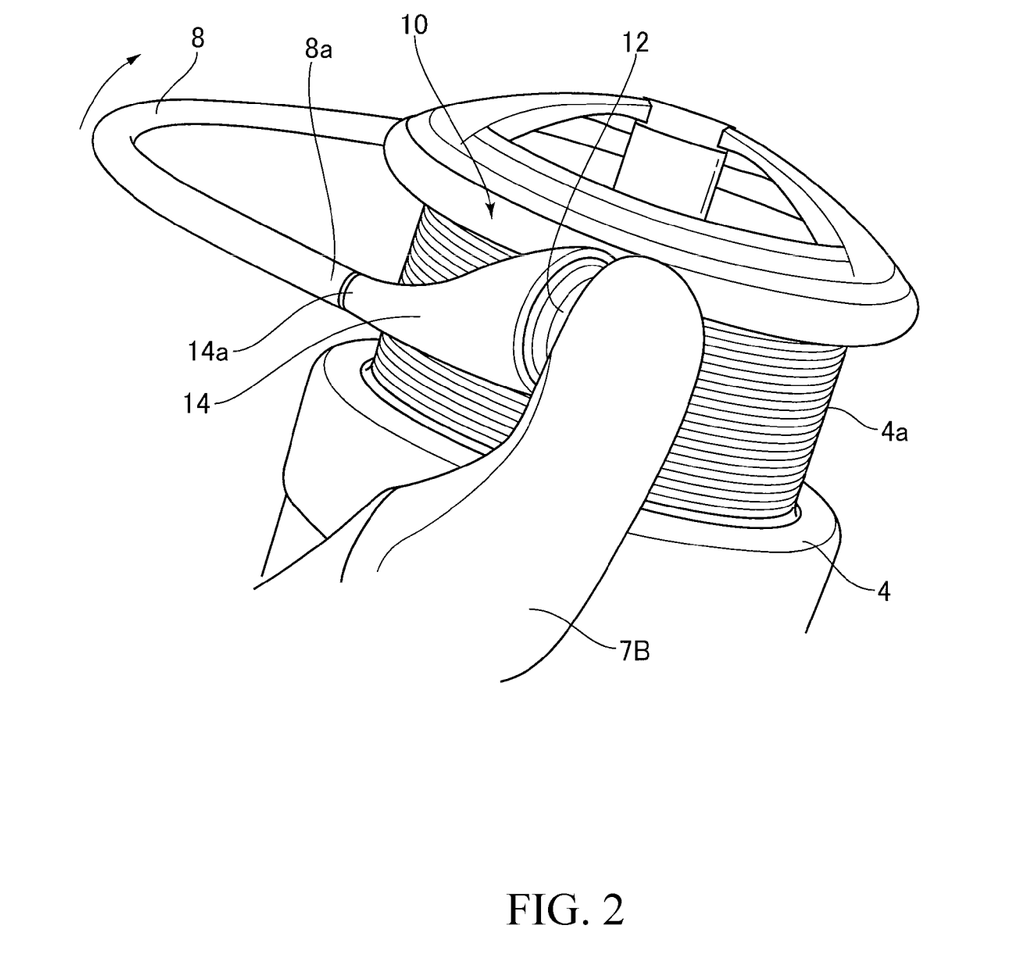
FIG. 2 is an enlarged view of a fishing line guide in the structure illustrated in FIG. 1.
Figure 3A:
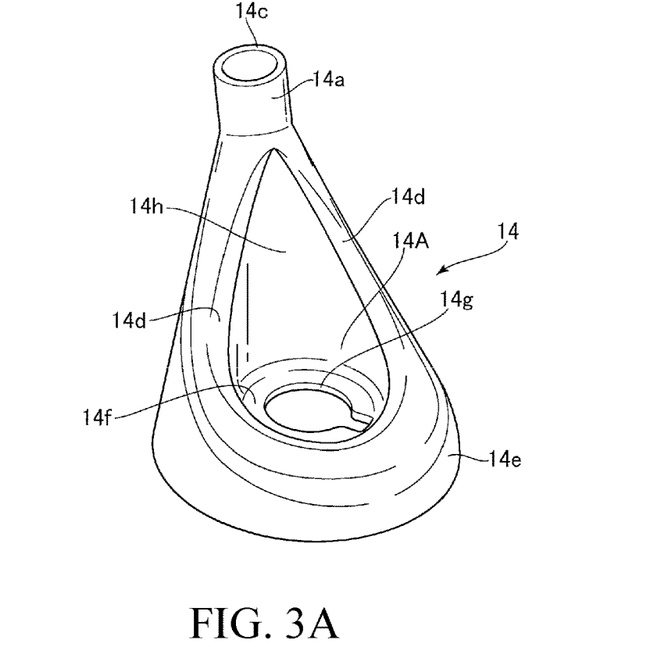
FIG. 3A is a perspective view of a line slider that is a component of the fishing line guide illustrated in FIG. 2 as viewed from a side from which a screw member is inserted.
Figure 3B:
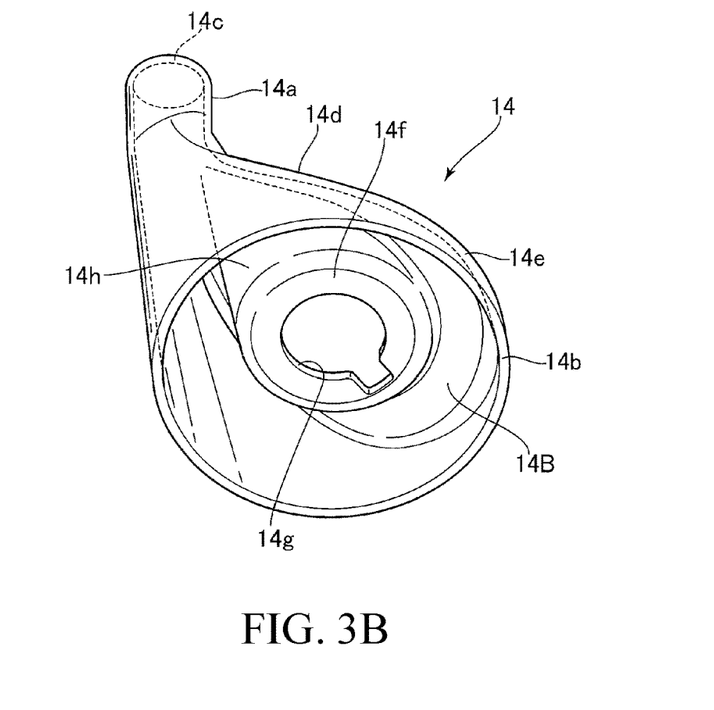
FIG. 3B is a perspective view of the line slider as viewed from an arm lever side.
Figure 4A:
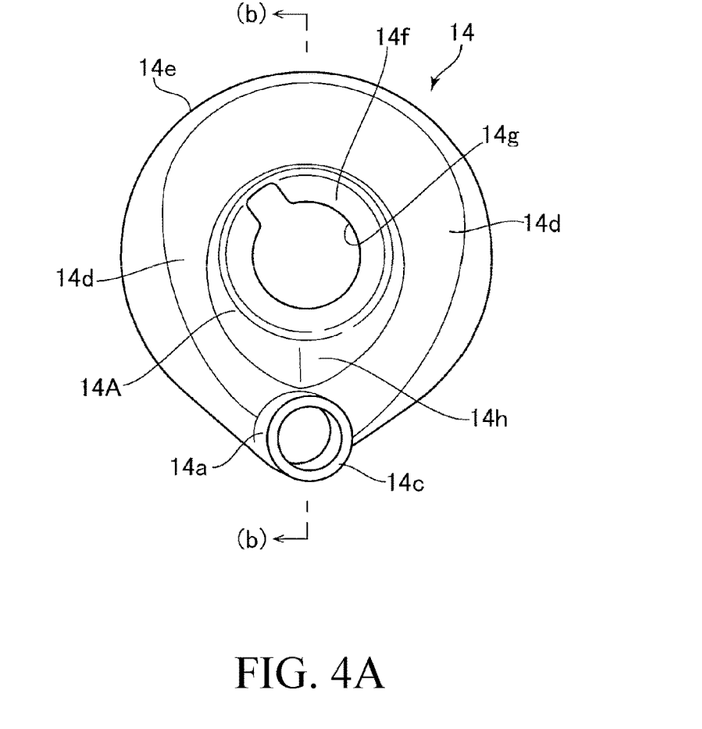
FIG. 4A is a plan view of the line slider.
Figure 4B:
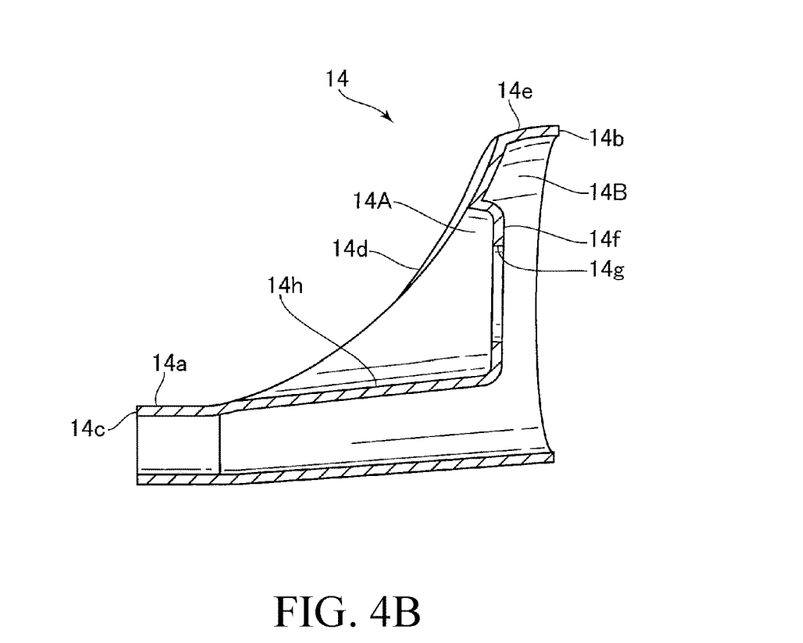
FIG. 4B is a cross-sectional view of the line slider taken along a line (b)-(b) of FIG. 4A.

An embodiment of a fishing spinning reel according to the present disclosure will be described below. FIGS. 1 and 2 are diagrams illustrating an embodiment of the fishing spinning reel according to the present disclosure, FIG. 1 is a side view of an overall structure, and FIG. 2 is an enlarged view of a fishing line guide (fishing line guide portion) of the fishing spinning reel illustrated in FIG. 1.

The fishing spinning reel 1 includes a reel main body 2 provided with a foot 2A to be attached to a fishing rod. The reel main body includes a handle shaft rotatably supported via a bearing, and a handle 3 is attached to an end of the handle shaft, the handle 3 being operated to retrieve a line. Further, a known driving force transmission mechanism is coupled to the handle shaft, and the rotation operation of the handle 3 drives and rotates a rotor 5 and causes a known oscillating mechanism to move a spool 4 back and forth.

The rotor 5 includes a pair of arms 6 (only one of the arms is illustrated) formed at an interval of approximately 180° and extending in an axial direction to face each other, and the spool 4 is placed between the pair of arms and is driven to move back and forth. At their respective distal ends of the arms 6, arm levers 7A, 7B are supported to be pivotable between a fishing line retrieve position and a fishing line cast position. Further, to each of the arm levers 7A, 7B, a corresponding proximal end of a bail 8 having a U shape is fastened, allowing the bail 8 to pivot together with the arm levers 7A, 7B. As illustrated in FIG. 2, a fishing line guide 10 is disposed at a distal end of the arm lever 7B that is one of the arm levers 7A, 7B (located on the opposite side of FIG. 1).

As is known, the fishing line guide 10 includes a line roller 12 that guides the fishing line to the spool 4 and a line slider 14 that guides the fishing line from the bail 8 to the line roller 12, and one proximal end 8a of the bail 8 is joined to the line slider 14. In this case, the bail 8 according to the present embodiment is formed into a hollow structure and is integrally joined to an attachment part 14a of the line slider 14. Alternatively, the bail 8 having a solid structure may be integrally joined to the attachment part 14a of the line slider 14, or may be integrally formed with the line slider 14 to directly extend from the attachment part 14a of the line slider 14.

FIG. 1 illustrates a fishing line retrieve-enabled state. The rotation operation of the handle 3 in this state causes the driving force transmission mechanism to drive and rotate the rotor 5 and causes the oscillating mechanism to drive and move the spool 4 back and forth. This allows the fishing line to be evenly wound onto a fishing line winding body 4a of the spool 4 via the line roller 12 of the fishing line guide 10 of the arm lever 7B that rotates together with the rotor 5.

Further, when the bail 8 is pivotally moved (pivotally moved in an arrow direction) from the fishing line retrieve-enabled state illustrated in FIG. 1 to the fishing line cast position together the arm levers 7A, 7B, the fishing line wound onto the spool 4 is brought into a cast-enabled state. Then, when the bail 8 is pivotally moved from the fishing line cast position to the fishing line retrieve position after the fishing line (rig) is cast in the fishing line cast-enabled state, the fishing line is picked up by the bail 8 and guided to the line roller 12 on the line slider 14 to enter the fishing line retrieve-enabled state illustrated in FIG. 1. Note that the bail 8 may be pivotally moved from the fishing line cast position to the fishing line retrieve position by hand (moved in the reverse direction) with the bail 8 held, or alternatively may be pivotally moved by a known automatic return mechanism in response to the retrieve operation of the handle 3.

Next, a structure of the fishing line guide 10 will be described with reference to FIGS. 3A to 5. As described above, the fishing line guide 10 includes the line roller 12 and the line slider 14, and the line roller 12 is formed into a tubular shape and is rotatably supported between the arm lever 7B and the line slider 14. As will be described later, the line roller 12 according to the present embodiment is rotatably supported, via a pair of bearings (rolling bearings) 17, 18, by a fastening member (screw member) 15 with which the line slider 14 is fastened to the arm lever 7B.

The line slider 14 is integrally formed of a light and slidable metal material, such as a thin film of a stainless alloy or aluminum alloy, and includes an opening 14b formed into a substantially circular shape adjacent to the arm lever 7B, and the attachment part 14a joined to the proximal end of the bail 8 on the opposite side from the opening 14b. The attachment part 14a includes an insertion port 14c having a size allowing a joint pipe 30 (see FIG. 5) to fit into the insertion port 14c, the joint pipe 30 being fitted into and fastened to the proximal end 8a of the bail 8, and the line slider 14 and the bail 8 are integrally joined by the joint pipe 30 fitted into and fastened to the insertion port 14c by adhesion or the like.

The line slider 14 has a depression (concave portion or depressed portion) (first depression) 14A that accommodates at least a part of a head (head portion) 15a of the fastening member 15. The first depression 14A is formed between a pair of inclined parts 14d that gradually flares and rises from the attachment part 14a toward the arm lever in the axial direction. Each upper end of the pair of inclined parts 14d located on both sides of the first depression 14A is integrated with a ring-shaped annular part (a ring-shaped annular portion) 14e, the opening 14b is formed adjacent to the arm lever, and each lower end of the pair of inclined parts 14d is integrated with the attachment part 14a.

The annular part 14e is uniform in length in the axial direction, and a ring-shaped wall (a ring-shaped wall portion) 14f is integrally formed, adjacent to the bail, with an inner peripheral surface of the annular part 14e. The wall 14f serves as a partition that separates the first depression 14A from a depression (concave portion or depressed portion) (second depression) 14B provided inside the annular part 14e that can accommodate an end of the line roller 12. The first depression 14A separated by the wall 14f accommodates at least the part of the head 15a of the screw member 15 with which the line slider 14 is fastened to an inner side surface of the distal end of the arm lever 7B. Further, the second depression 14B accommodates the end of the line roller 12 and covers an outer periphery of the end with a minute gap G provided between the outer periphery and the inner peripheral surface of the annular part 14e.

In the above-described structure, the screw member 15 is inserted from the bail side, the bearings 17, 18 are attached to an intermediate part of a shank (shank portion or shaft portion) 15b of the screw member 15, and an external thread (external thread portion) 15c formed on an end of the shank 15b is engaged with and fastened to an internal thread 7b provided on an inner surface 7a of the arm lever 7B. Therefore, the first depression 14A and the second depression 14B are formed to communicate with each other through the wall 14f, and the wall 14f has an opening 14g through which the shank 15b of the screw member 15 is inserted.

Further, the bearings 17, 18 supported by the shank 15b are positioned and supported with axial movement restricted. For example, the line roller 12 has an annular protrusion (annular protrusion portion) 12a formed on an inner periphery of a center part of the line roller 12, and ring-shaped restricting members 19, 20 are attached in contact with the annular protrusion 12a from both sides in the axial direction. The restricting members 19, 20 have flanges 19a, 20a formed at ends of restricting members 19, 20, respectively, and the bearings 17, 18 are attached in contact with the flanges to position outer races of the bearings 17, 18 in the axial direction. Further, spacers 21, 22 are provided adjacent to outer ends of inner races of the bearings 17, 18 in the axial direction and interposed between the bearing 17 and the wall 14f and between the bearing 18 and the internal thread 7b formed on the arm lever 7B, respectively, to position the bearings 17, 18 in the axial direction. In addition, a positioning spacer 23 is interposed between the inner races of the bearings 17, 18. Note that a protecting member 25 capable of preventing the intrusion of water and sand may be disposed between the spacer 22 and the arm lever 7B.

Accordingly, the screw member 15 is inserted from the bail side into the wall 14f interposed between washers 27, 28, the spacer 21, the bearing 17, the restricting member 19, and the line roller 12 are attached to the shank 15*b*, the spacer 23, the bearing 18, the restricting member 20, the spacer 22, and the protecting member 25 are attached to the shank 15*b*, and the screw member 15 is fastened to the arm lever 7B, thereby allowing the fishing line guide 10 to be fastened to the arm lever 7B.

The above-described fishing line guide 10 has a structure in which the wall 14*f* that separates the first depression 14A from the second depression 14B is integrally formed with the line slider 14, which eliminates the need of press-fitting a separate support member to an opening end of an arm lever in the related art. That is, the wall 14*f* and the line slider 14 are formed of a single member, so that it is possible to reduce the weight of the line slider to make the rotor rotation well-balanced, which in turn allows an increase in fishing operability. Further, the method for fastening the fishing line guide 10 to the arm lever 7B includes inserting the screw member 15 from the bail 8 side so as to cause at least the part of the head 15*a* of the screw member 15 to be accommodated in the first depression 14A of the line slider 14, so that it is possible to make the surface flush without exposing the screw member to the arm lever and thus make the fishing line less prone to tangle. Further, the head 15*a* is positioned between both the inclined parts (inclined portions) 14*d* so as to make the fishing line less prone to tangle even inside the line slider 14.

That is, the above-described line slider 14 structured to allow the bail 8 and the arm lever 7B to be integrated with each other, allow the first depression 14A and the second depression 14B separated from each other by the wall 14*f* to accommodate the head of the screw member 15 and the end of the line roller 12, respectively, and allow the fishing line picked up by the bail 8 to be guided to line roller 12 can be reduced in weight as much as possible.

Further, the first depression 14A and the second depression 14B are formed to communicate with each other through the wall 14*f* having the opening 14*g* and are structured to receive the screw member 15 that is inserted through the first depression 14A and the second depression 14B to cause the shank 15*b* of the screw member to support the bearings 17, 18 and to cause the end of the line roller 12 to be accommodated in the second depression 14B, so that it is possible to make the fishing line guide 10 compact in size to reduce the weight as much as possible, thereby allowing a further increase in fishing operability.

Note that the attachment part 14*a* of the line slider 14 according to the present embodiment has the part joined to the proximal end of the bail formed into a hollow structure so as to be further reduced in weight. Furthermore, the first depression 14A and the attachment part 14*a* having a hollow structure are separated from each other by a plate-shaped part 14*h*, and the wall 14*f* is integrated with a part, adjacent to the arm lever, of the plate-shaped part 14*h*. That is, the first depression 14A is separated from the attachment part 14*a* by a curved bottom surface (plate-shaped part 14*h*), thereby preventing seawater, a foreign matter, or the like from entering the attachment part 14*a* from the first depression 14A. Further, even when the bail 8 is formed into a hollow structure, seawater, a foreign matter, or the like does not enter the bail.

The attachment part 14*a* formed into a hollow structure may be structured to communicate with the first depression 14A and the second depression 14B (a structure without the bottom surface), thereby allowing a further reduction in weight of the line slider.

The above-described line slider 14 may be formed by, for example, integrally-molding a base material such as a plate material or a pipe material through a plurality of processes such as press molding and cutting or integrally-molding a resin material or a metal material with a mold, and the material and manufacturing method of the line slider 14 are not limited to any specific material and method, and the line slider 14 and the bail 8 may be integrally formed.

Figure 5:
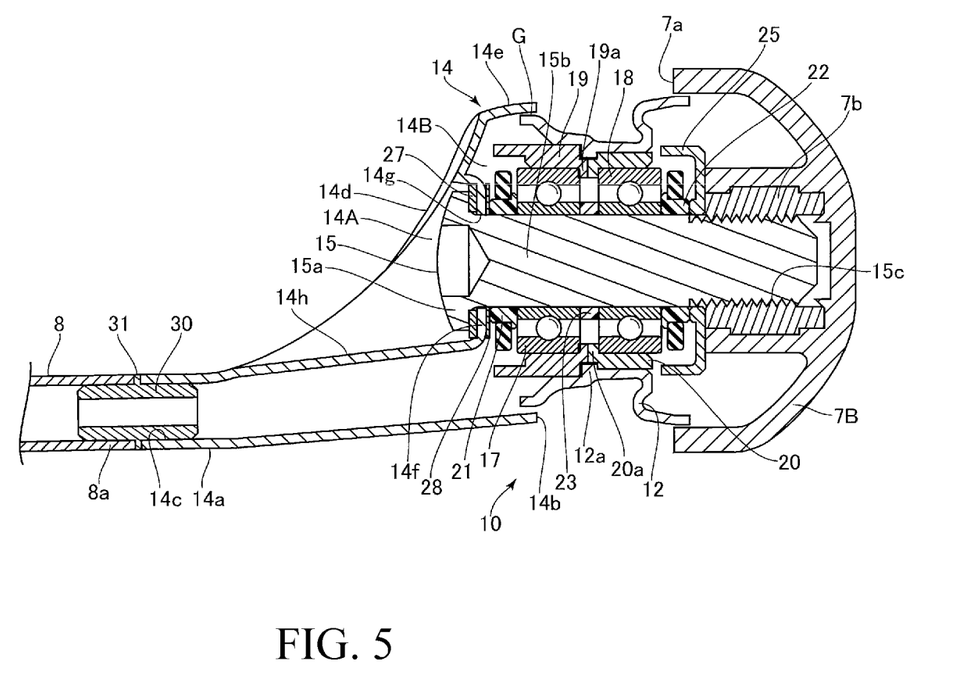
FIG. 5 is a cross-sectional view of a main part of the fishing line guide illustrated in FIG. 2.

Further, the joint structure between the line slider 14 and the bail is not limited to any specific structure. For example, as illustrated in FIG. 5, both the line slider 14 and the bail 8 can be joined together to be flush with each other with no step by press-fitting the joint pipe 30 having a center flange 31 to the attachment part 14*a* of the line slider 14 and the proximal end 8*a* of the bail 8, fastening the attachment part 14*a* and the proximal end 8*a* to the joint pipe 30 by adhesion or the like with both the line slider 14 and the bail 8 in contact with the center flange 31, and grinding the center flange 31.

Although the embodiment according to the present disclosure has been described above, the present disclosure is not limited to the above-described structure, and various modifications may be made. The present disclosure is characterized by the unique line slider 14 that is a component of the fishing line guide 10, and the other structures are not limited to the structures according to the above-described embodiment, and various modifications may be made. For example, the outer peripheral surface shape, the material, and the like of the line roller 12 are determined as desired, and the bearings 17, 18 that support the line roller 12 may be, for example, a tubular collar member that is integrally formed of a synthetic resin or the like to be deformed as desired.

Further, the wall 14*f* of the line slider 14 may be formed of the same material as the material of the line slider and integrally formed with the line slider to separate the first depression 14A from the second depression 14B, and the wall 14*f* serving as the partition may have a protrusion that supports a bearing. Furthermore, the appearance shape of the line slider 14 may also be modified as desired.

What is claimed is:

1. A fishing spinning reel comprising:
   a rotor configured to rotate by rotation operation of a handle rotatably supported by a reel main body;
   a spool configured to move back and forth by the rotation operation of the handle; and
   a fishing line guide disposed on one of arm levers pivotably supported by a pair of arms provided on the rotor to guide a fishing line to the spool,
   wherein the fishing line guide includes:
   a line roller configured to guide the fishing line picked up by a bail attached to the pair of arms to the spool, and
   a line slider configured to guide the fishing line from the bail to the line roller,
   wherein the line slider includes:
   an attachment part that the bail is integrally joined to or formed with;
   a first depression configured to accommodate at least a part of a head of a screw member when the screw member is attached, wherein the screw member is inserted from a bail side and the screw member is configured to fasten the line slider to one of the arm levers;
   a second depression configured to accommodate an end of the line roller and covering to cover an outer periphery of the end with a minute gap provided; and a wall configured to separate the first depression from the second depression, wherein the wall and the line slider are formed of a single member, wherein the first depression and the second depression are formed to communicate with each other by a circular opening in the wall, wherein the circular opening is provided with a recess.

2. The fishing spinning reel according to claim 1, wherein the attachment part is formed into a hollow structure, the first depression and the attachment part having a hollow structure are separated by a plate-shaped part, and the wall is integrated with the plate-shaped part.

3. The fishing spinning reel according to claim 1, wherein the attachment part is formed into a hollow structure and communicates with the first depression and the second depression.

* * * * *